United States Patent [19]

Nakajima et al.

[11] Patent Number: 4,863,240
[45] Date of Patent: Sep. 5, 1989

[54] APPARATUS FOR ACTUATING OBJECTIVE LENS

[75] Inventors: Atsunobu Nakajima; Seiji Hoshi; Hiroyoshi Yamamoto; Chikara Miyata; Ikuo Nanno; Shigeru Inagaki; Hideo Hoshi, all of Tokyo, Japan

[73] Assignee: Seiko Instruments & Electronics Ltd., Tokyo, Japan

[21] Appl. No.: 919,317

[22] Filed: Oct. 14, 1986

[30] Foreign Application Priority Data

Nov. 5, 1985 [JP] Japan ................. 60-247723

[51] Int. Cl.$^4$ .............................................. G02B 7/02
[52] U.S. Cl. .................................... 350/247; 350/255
[58] Field of Search ............................. 350/247, 255; 369/43–45

[56] References Cited

U.S. PATENT DOCUMENTS 4,473,274  9/1984  Yano et al. ........................... 350/255
4,571,026  2/1986  Maruta ................................. 350/247
4,664,476  5/1987  Kasuga ................................. 350/247

FOREIGN PATENT DOCUMENTS 59-229750  12/1984  Japan ................................. 350/255

OTHER PUBLICATIONS

Patent Abstracts of Japan, vol. 9, No. 312 (P-411), 7th Dec. 1985 (Toshiba).
Patent Abstracts of Japan, vol. 8, No. 42 (P-265) [1479], 23rd Feb. 1984 (Sony).
Patent Abstracts of Japan, vol. 9, No. 109 (P-355) [1832], 14th May 1985 (Seiko Denshi Kogyo).

Primary Examiner—Bruce Y. Arnold
Assistant Examiner—Loha Ben
Attorney, Agent, or Firm—Bruce L. Adams; Van C. Wilks

[57] ABSTRACT

An apparatus actuates an objective lens in axial and circumferential directions through annular magnetic gaps which are formed by yokes and a magnet. In order to retain the objective lens in the neutral position in the circumferential direction, two or four magnetic pieces are mounted on a lens mount and disposed near the circumferetial ends of the annular magnetic gaps in which the force caused by the magnetic potential energy in the magnetic gaps acts on the magnetic pieces to pull them back in the direction of the magnetic gaps so that a magnetic spring for retaining the objective lens at the neutral position is formed by the magnetic pieces.

8 Claims, 4 Drawing Sheets

APPARATUS FOR ACTUATING OBJECTIVE LENS

BACKGROUND OF THE INVENTION

1. Field of the Invention

The present invention relates to an actuator for use in an optical pickup, and more particularly, to improvements in retaining the neutral point of tracking in an actuator of the type in which focusing and tracking are performed by sliding the lens in the axial direction and by rotating the line about a shaft, respectively.

2. Description of the Prior Art

In an actuator in which focusing and tracking are conducted by sliding a lens in the axial direction and rotating the lens around a shaft, respectively, it is common to use a rubber spring to retain the neutral point of tracking. FIG. 2 shows an example of such a conventional actuator. In the Figure, one end of a rubber spring 21 is fixed to a pin 23 set up in a fixed or stationary portion such as a yoke, and the other end thereof is fixed through a pin 22 to an objective lens retaining tube 1 constituting a movable or rotary portion and having a central portion and an annular peripheral portion. When the objective lens moves in the tracking direction indicated by the double-headed arrow A, its neutral point is retained by the resilient force of the rubber spring 21.

This conventional method of retention by a rubber spring, however, requires the provision of space for the rubber spring, and is therefore very inconvenient from the view point of the desirability of reducing the size of the pickup, which has been requested more and more in recent years.

If the rubber spring is inaccurately mounted in such a way that it is distorted, nonlinearity may be generated in the spring action, or the neutral position of the objective lens may be deflected from the outset. This makes the process of mounting the rubber spring very troublesome.

In addition, the rubber spring does not have good temperature characteristics owing to the physical properties of its material, and is subjected to deterioration as its resonance frequency or sensitivity changes.

When the objective lens retaining tube 1 is raised to its operating point by passing a bias current through a focusing servomechanism, the rubber spring generates a force which pulls it downward, thereby necessitating to flow a larger bias current. In this way, the rubber spring affects the movement of the objective lens in the focusing direction.

SUMMARY OF THE INVENTION

It is an object of the present invention to provide an actuator which requires no space for a spring to be used for tracking, which is easily manufactured, which exhibits excellent temperature characteristics, and which gives almost no influence to the focusing direction, thereby overcoming the problems of the conventional actuator.

To this end, according to the present invention, there is provided an actuator which incorporates two or four pieces of a magnetic substance attached to the peripheral portion of an objective lens retaining tube, so as to form a magnetic spring for tracking by the interaction between the pieces of a magnetic substance and a magnetic circuit, thereby reducing the size of the actuator, simplifying the manufacturing process, improving the temperature characteristics, and eliminating the effect on the focusing operation.

The present invention is based on the principle that a piece of a magnetic substance, when placed in a magnetic field in which the distribution of magnetic flux density varies, is subjected to force which attracts it toward the area where the magnetic flux density is larger. At the vicinity of the ends of the magnetic gap, as viewed in the circumferential direction, the magnetic flux density gradually changes owing to leakage of the flux, and a magnetic spring force acting in the tracking direction is generated by placing the piece of magnetic subtance at that point.

Specifically, two or four pieces of magnetic substance are attached to the peripheral annular portion of the rotary objective lens retaining tube in symmetric relation with respect to a plane containing both the axis of rotation of the retaining tube and the center of the objective lens when the lens is in the neutral position. These magnetic substances are disposed at positions near the circumferential ends of two magnetic annular gaps arranged in symmetric relation with respect to the same plane. At the circumferential ends of magnetic gaps, the magnetic flux density changes to some extent in the circumferential direction but by only a small amount in the axial direction. In consequence, when the objective lens retaining tube rotates in the tracking direction, a force of restitution is generated. When the tube is slid in the axial direction or focusing direction, however, almost no force acts on the objective lens retaining tube.

DETAILED DESCRIPTION OF THE PREFERRED EMBODIMENT

Figure 1:
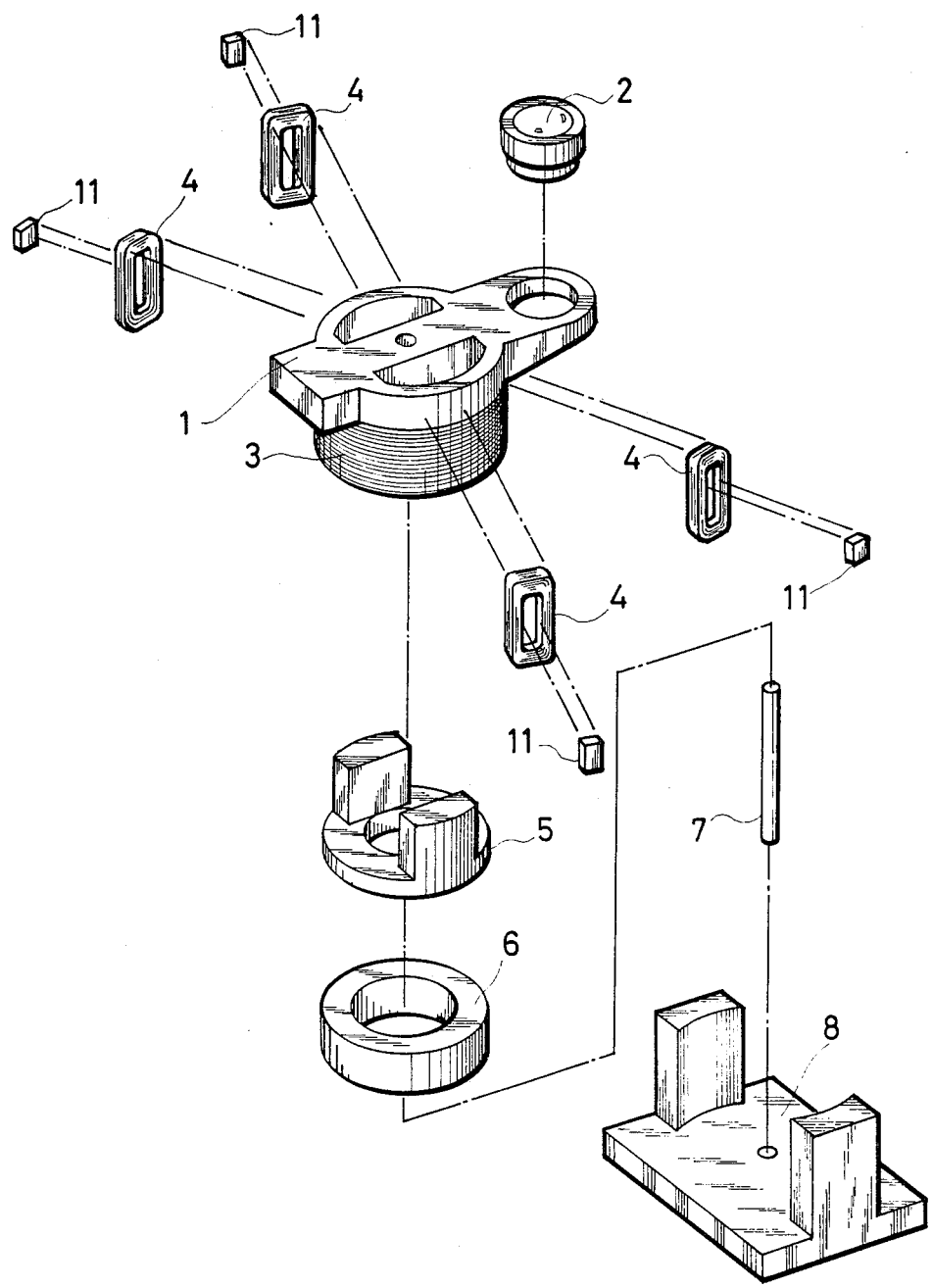
FIG. 1 is a perspective view of an actuating apparatus of the present invention.
Figure 2:
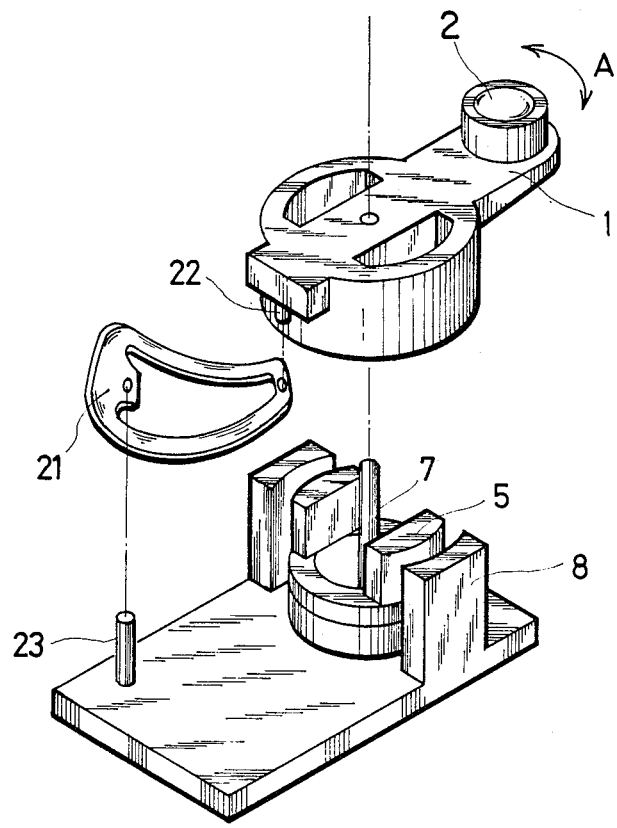
FIG. 2 is a perspective view of a conventional apparatus provided with a retention rubber spring.

An embodiment of the present invention will be described hereinunder with reference to the accompanying drawings. Referring first to FIG. 1, an objective lens retaining tube 1 is provided with an objective lens 2, a focusing coil 3, tracking coils 4 and four magnetic pieces 11 of magnetic substance. The lens retaining tube 1 can be rotated about a supporting shaft 7 and be slid in the axial direction of the supporting shaft 7. The focusing coil 3, tracking coils 4 and pieces 11 of magnetic substance are positioned in magnetic gaps defined by an inner yoke 5, a magnet 6 and an outer yoke 8.

Figure 3:
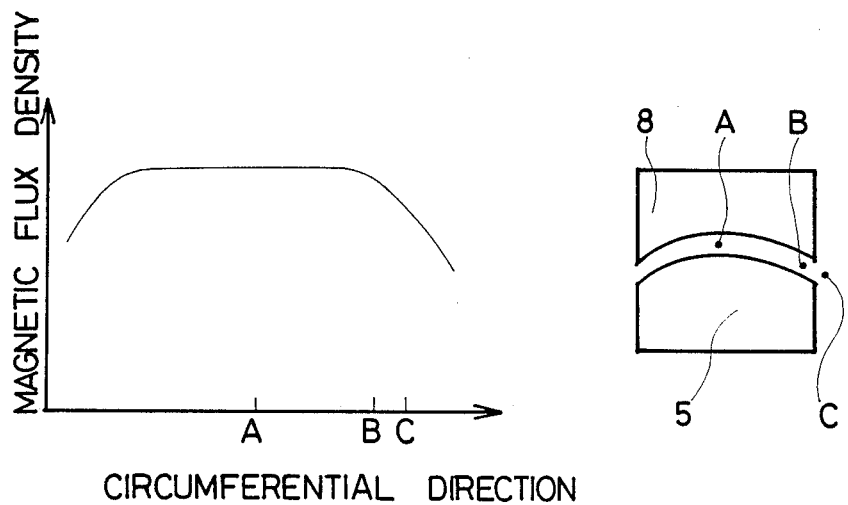
FIG. 3 is a graph illustrating the distribution of magnetic flux density in a magnetic gap, as viewed in the circumferential direction, which is obtained in an embodiment of the present invention.

FIG. 3 shows the distribution of magnetic flux density in the magnetic gap in the circumferential direction corresponding to the tracking direction, more precisely, the distribution of the radial component of the magnetic flux density vector with respect to the supporting shaft. Other components can be disregarded, since they are so small. All distributions hereinafter referred to are distributions of radial components, unless otherwise stated. As can be seen from the Figure, the inside of the magnetic gap shows a uniform distribution of magnetic flux density. At points B and C near the end of the magnetic gap, however, the magnetic flux density gradually changes owing to the leakage of the magnetic flux. In consequence, when a piece of magnetic substance is placed near the end of the magnetic gap, a magnetic force acts on piece of magnetic substance, pulling the piece in the circumferential direction into the magnetic gap which has a larger magnetic flux density.

Figure 4:
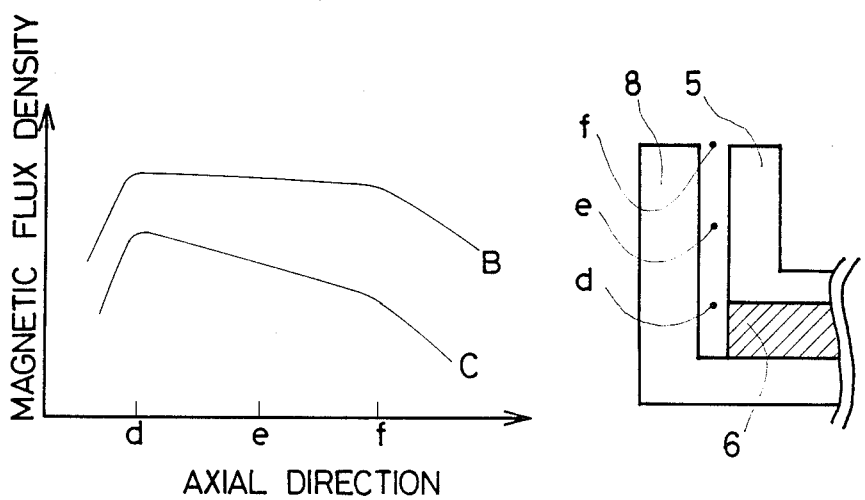
FIG. 4 is a graph illustrating the distribution of magnetic flux density in a magnetic gap in the axial direction, which is obtained in an embodiment of the present invention.

Similarly, FIG. 4 shows the distribution of magnetic flux density in the magnetic gap in the axial direction corresponding to the focusing direction. The magnetic flux density in the axial direction is distributed in a different way at points B and C. Namely, at point B, which is closer to point A, the center of the magnetic gap, the distribution of magnetic flux density in the axial direction is relatively uniform between a point d which represents the edge of the magnet 6 shown in FIG. 4 and a point f which represents the edge of the magnetic gap. On the other hand, at point C which is located outward from point B, the magnetic flux density is smaller over the entire axial length of gap, and changes greatly between points d and f. It is therefore clear that, if the piece is placed at point C, the piece of magnetic substance is affected by the axial component of the magnetic force acting in the focusing or axial direction as well as the circumferential component of the magnetic force acting in the tracking or circumferential direction.

Figure 5:
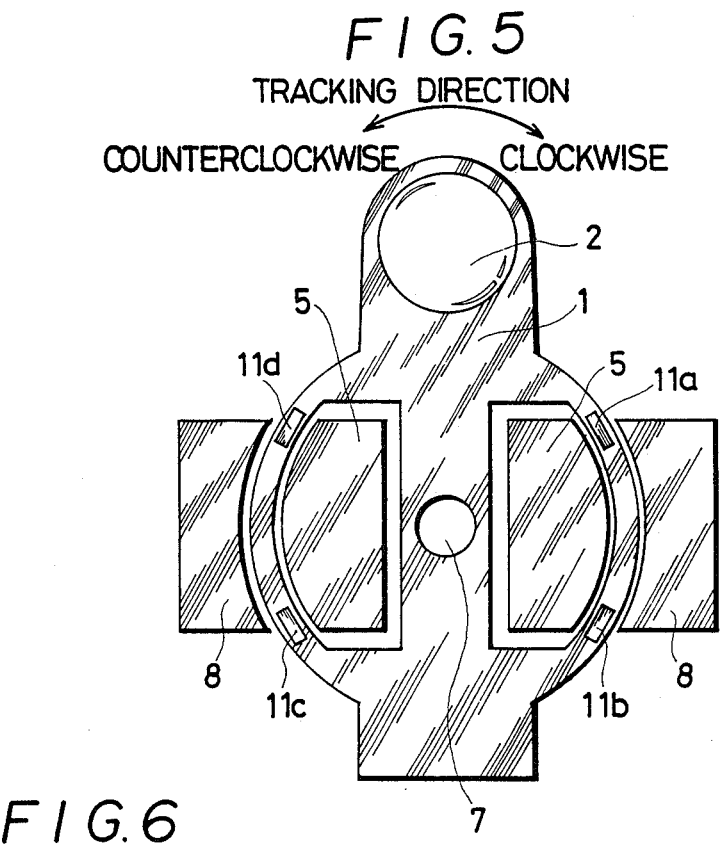
FIG. 5 is a plan view of an embodiment of the present invention, showing the positions of the pieces of magnetic substance.

From the foregoing description, it is clear that there is an optimum position at which the piece of magnetic substance should be placed to form a magnetic spring, and at which the magnetic force acts on the piece of magnetic substance in the tracking direction but no force is applied thereto in the focusing direction. This is point B of FIG. 3 in the circumferential direction and point e near the mid-point between points d and f of FIG. 4 in the axial direction. In this case, point e designates a mid-point obtained when the objective lens retaining tube is raised to its operating point or bias point through a focusing servomechanism. The optimum position for the magnetic substance piece may vary with the configuration or construction of the magnet and yokes employed. However, the optimum position can be determined on the basis of the concept of this embodiment. FIG. 5 shows an actuator having four pieces of magnetic substance 11a, 11b, 11c and 11d disposed symmetrically with respect to a plane passing through the rotational axis of the retaining tube 1 and the center of the objective lens 2 when the lens is in its neutral position. When the rotary objective lens retaining tube 1 moves in the clockwise direction which is the tracking direction, the pieces of magnetic substance 11b and 11d are moved into magnetic fields where the magnetic flux density gradually decreases, as shown in FIG. 3, and are therefore subjected to a magnetic force which tends to pull them back into the magnetic gaps. In this case, the pieces of magnetic substance 11a and 11c enter the magnetic fields formed in the magnetic gaps which have uniform magnetic field distribution, and no force is applied thereto. When the objective lens retaining tube 1 moves in the counterclockwise direction, on the other hand, a similar magnetic force acts on the pieces of magnetic substance 11a and 11c, generating a force which pulls the objective lens retaining tube 1 back to its neutral position. A magnetic spring which retains the objective lens at its neutral point is thus formed. Accordingly an ideal actuator in which substantially no spring force is generated in the focusing direction can be obtained.

The actuator of this embodiment employs four pieces of magnetic substance. It is apparent, however, that the neutral position retaining spring can be formed by only the pieces of magnetic substance 11a and 11d or by only the pieces of magnetic subtance 11b and 11c in FIG. 5.

Figure 6:
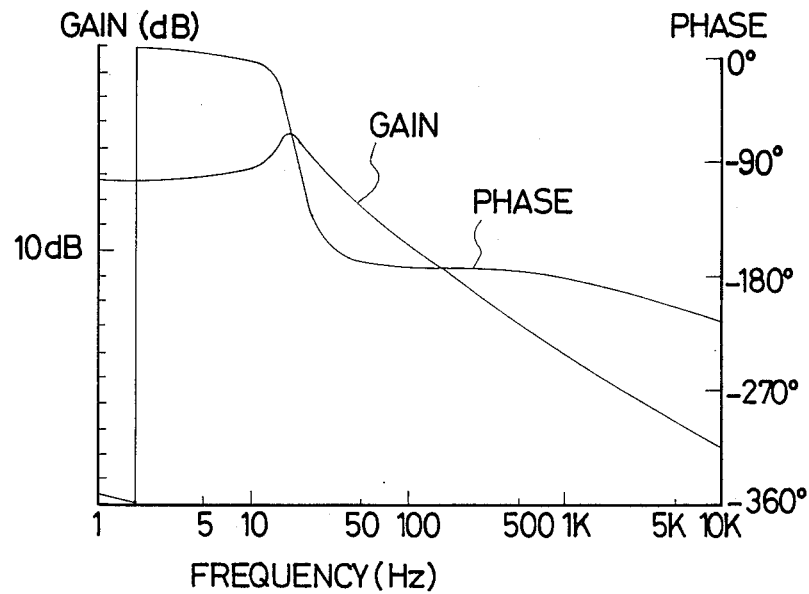
FIG. 6 shows the results of measurement of the frequency characteristics of the tracking of the embodiment.

FIG. 6 is a graph illustrating the frequency characteristics of the tracking. This graph shows that no secondary vibrations are generated and that very excellent spring characteristics are available.

As is clear from the foregoing description, according to the present invention, a mechanism for retaining the neutral tracking position can be constructed by simply attaching pieces of magnetic substance to the objective lens retaining tube. In consequence, the space necessary for the rubber spring in the conventional actuator can be eliminated, thereby contributing to a reduction in the size of the actuator.

When the retention is performed by a rubber spring, since it is difficult to mount it accurately without distorting the rubber, nonlinearity may be generated in the spring action and the neutral position may be deflected from the outset. However, it is relatively easy to attach pieces of magnetic substance to the objective lens retaining tube with accuracy to remove such kind of problems.

Since this device utilizes a magnetic action, it has very excellent temperature characteristics, compared with the conventional rubber spring.

In addition, the device does not substantially affect the focusing operation, and therefore requires a smaller bias current than that necessary for a rubber spring, thereby making the power consumption lower.

What is claimed is:

1. In an apparatus for actuating an optical element in a circumferential direction about an axis and in an axial direction along the axis: stationary means having means defining an annular magnetic gap extending arcuately in the circumferential direction and linearly in the axial direction for establishing in the annular magnetic gap a magnetic force having a circumferential component in the circumferential direction and an axial component in the axial direction; rotary means for mounting thereon the optical element, the rotary means having a central portion supported by the stationary means rotatably in the circumferential direction and slideably in the axial direction and having an annular peripheral portion disposed within the annular magnetic gap; electromagnetic actuating means disposed on the annular peripheral portion of the rotary means and coacting with the magnetic force for electromagnetically actuating the rotary means in the circumferential and axial directions; and magnetic retaining means disposed on the annular peripheral portion of the rotary means for magnetically retaining the rotary means in a given neutral position in the circumferential direction in response to the circumferential component of the magnetic force, but not being responsive to the axial component of the magnetic force to thereby allow the rotary means to freely move in the axial direction.

2. An apparatus according to claim 1; wherein the stationary means has means defining a pair of annular magnetic gaps disposed symmetrically to each other with respect to a plane containing the axis.

3. An apparatus according to claim 2; wherein the retaining means comprises a pair of magnetic pieces disposed symmetrically to each other with respect to the plane such that the pair of magnetic pieces are aligned with symmetric end portions of the pair of annular magnetic gaps to define the neutral position of the rotary means.

4. An apparatus according to claim 2; wherein the retaining means comprises four magnetic pieces disposed symmetrically with respect to the plane such that the four magnetic pieces are aligned with respective circumferential opposite end portions of the pair of annular magnetic gaps to define the neutral position of the rotary means.

5. An apparatus according to claim 1; wherein the retaining means comprises a magnetic piece disposed in a middle portion of the magnetic gap in the axial direction such that the magnetic piece is non-responsive to the axial component of the magnetic force.

6. An apparatus according to claim 1; wherein the stationary means includes an inner yoke facing an inner periphery of the annular periphery portion of the rotary means, an outer yoke facing an outer periphery of the annular peripheral portion of the rotary means, and a magnet for magnetically coupling the inner and outer yokes to each other to define an annular magnetic gap therebetween.

7. An apparatus according to claim 1; wherein the rotary means includes means for mounting an objective lens in a position radially deviated from the axis.

8. An apparatus according to claim 7; wherein the actuating means includes a first coil responsive to the circumferential component of the magnetic force for actuating the rotary means in the circumferential direction to effect tracking of the objective lens, and a second coil responsive to the axial component of the magnetic force for actuating the rotary means in the axial direction to effect focusing of the objective lens.

* * * * *